Feb. 27, 1934. A. A. GLIDDEN ET AL 1,949,159
COMPOUND VENTILATED FABRIC AND METHOD OF MAKING THE SAME
Filed Nov. 3, 1932    2 Sheets-Sheet 2
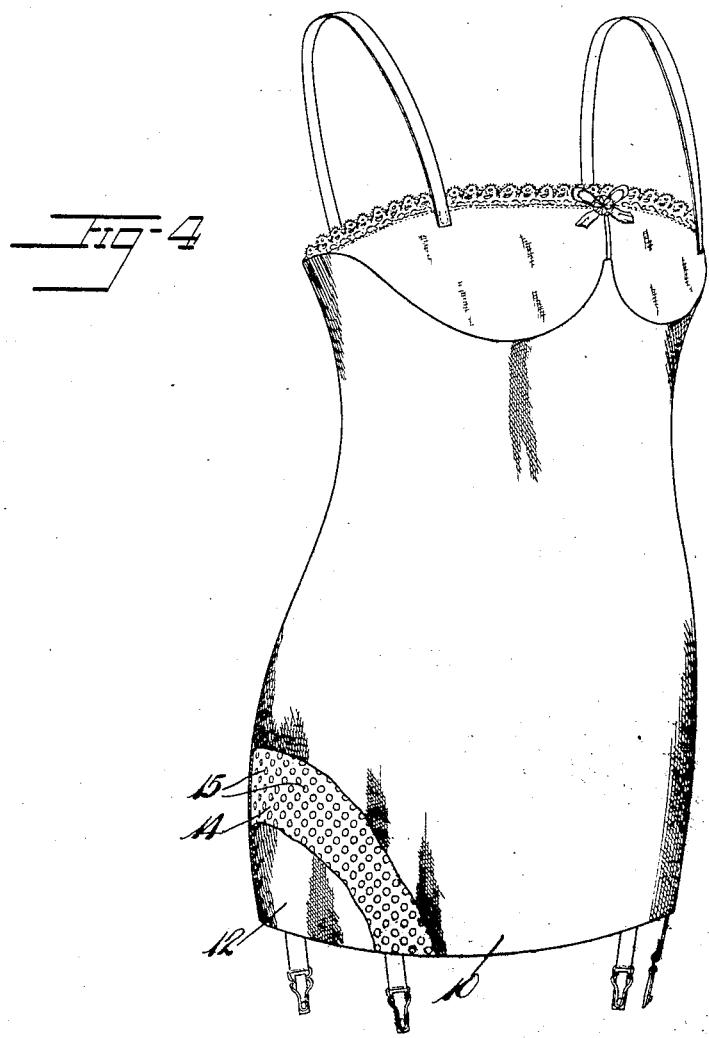
Inventors
Alfred A. Glidden
Virgil H. Bodle
By Eakin & Avery
Attys Patented Feb. 27, 1934

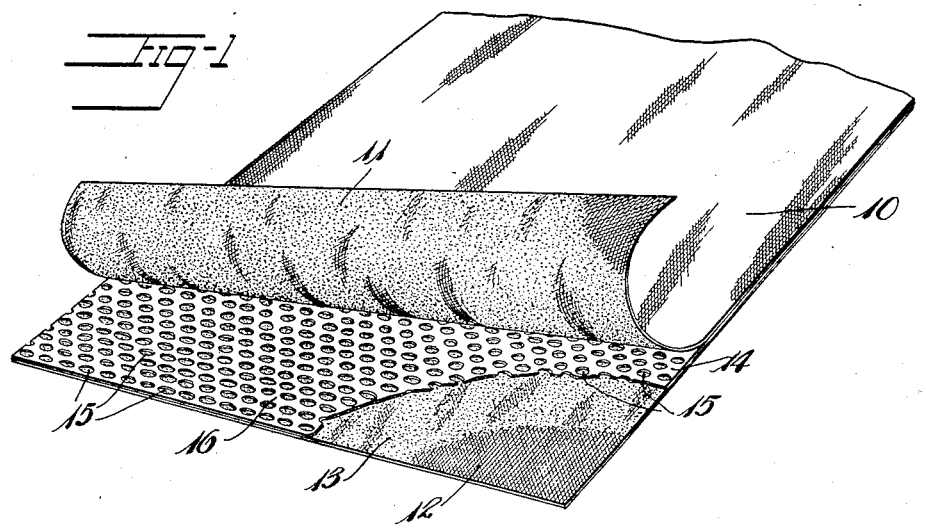
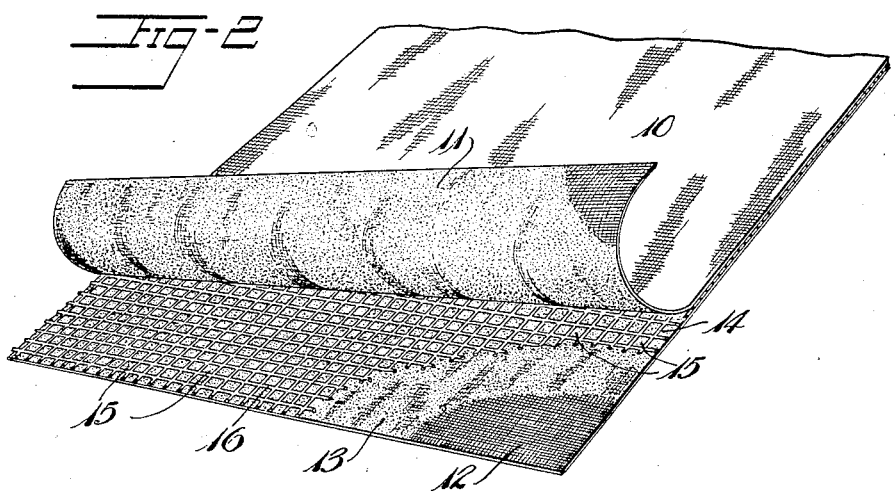
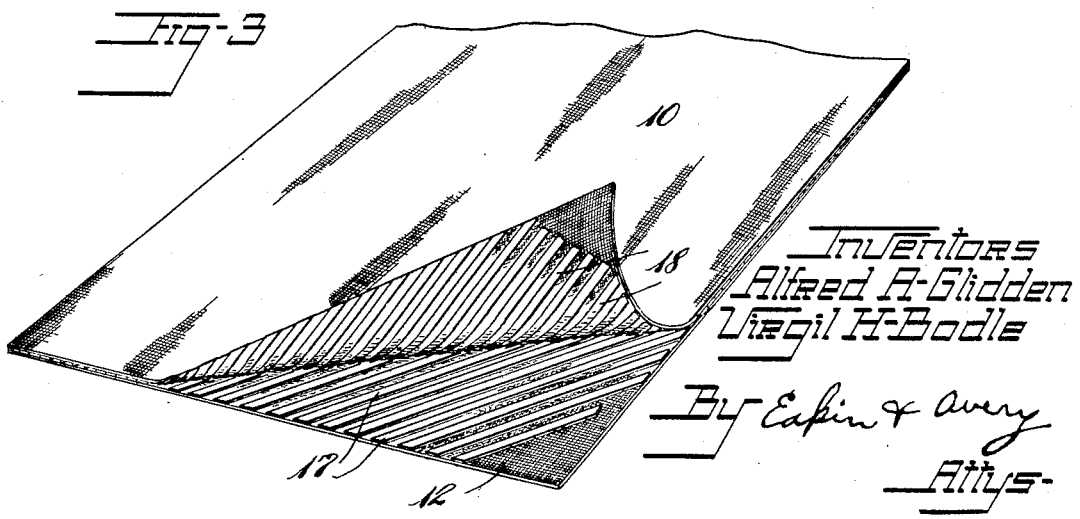

1,949,159

UNITED STATES PATENT OFFICE

REISSUED 1,949,159

COMPOUND VENTILATED FABRIC AND METHOD OF MAKING THE SAME

Alfred A. Glidden, Watertown, and Virgil H. Bodle, Newton, Mass., assignors to Hood Rubber Company, Inc., Watertown, Mass., a corporation of Delaware Application November 3, 1932. Serial No. 640,979

8 Claims. (Cl. 154—2)

This invention relates to compound ventilated fabrics and to methods of making the same.

The principal objects of the invention are to provide a ventilated sheet material having desirable characteristics including strength, elasticity and pliability and to provide simplicity and economy in methods of manufacture.

Other objects will appear from the following description and the accompanying drawings.

Referring to the drawings:

Fig. 1 is a perspective view of a compound fabric made according to the invention, the respective plies thereof being partially separated and partly broken away to illustrate the construction thereof.

Fig. 2 is a similar view of another form of the article of the invention, similarly illustrating the construction thereof.

Fig. 3 is a view showing in similar manner a further form of the article of the invention.

Fig. 4 is a perspective view of a foundation garment, showing one use of the compound fabric, parts of the outer layers being broken away to show the structure of the device.

Fig. 5 is a perspective view of a shoe having an upper of compound fabric made according to the invention a portion of one ply of the upper being turned back and part of an underlying ply being broken away to show the construction.

Referring to the drawings, the numeral 10 designates a pervious ply of material such as woven or knitted cloth comprising one face of the fabric. The numeral 11 designates an adhesive pervious coat of rubber or similar material applied to the ply 10 as by spraying so as to impart an adhesive coating without destroying the ventilating properties of the ply. The compound fabric also comprises a second facing ply 12 having a similar adhesive coating 13. Between these plies is located a perforate sheet of elastic rubber 14 formed with numerous apertures 15, preferably arranged in such geometric relation as to provide imperforate bands 16 of elastic material extending across the sheet in a plurality of directions constituting spaced elastic tension members separating the ventilating apertures 15. In the elastic sheet shown in Fig. 1 the apertures are shown as round, although other shapes may be employed, Fig. 2 showing the elastic sheet as having square apertures.

In place of a continuous sheet of elastic material as shown in Figs. 1 and 2, the elastic layer may consist of a plurality of plies of separate rubber bands 17, 18 arranged to cross each other in the finished fabric, as shown in Fig. 3, leaving ventilating apertures through the layer of elastic material.

The elastic ply may be formed in any desired manner either separately or in place on one of the plies 10 or 12 and may be vulcanized partially or completely before assembling the compound fabric or may be vulcanized in situ.

An elastic sheet such as shown in Fig. 1 may be made by depositing latex or dispersed rubber on a metal plate having rubber insulating plugs having the shape of the desired apertures inserted in openings therein to prevent deposit of rubber at those portions, electro deposition being employed to deposit the rubber.

Where it is desired to use a reticulated elastic sheet such as shown in Fig. 2 where the apertures are large as compared to the tension bands separating the apertures, such a reticulated sheet may be formed by depositing rubber compounds from a solution or dispersion containing the same upon a temporary support of perforated or reticulated material and before or after incorporating the resulting reticulated sheet in a compound fabric, disintegrating the temporary support by chemical or mechanical action to leave a reticulated structure containing the remains of the temporary support. Where it is not necessary for the compound fabric to be elastic the step of disintegrating the support may be omitted.

Where it is desired to form bands of rubber such as shown in Fig. 3 or a perforated sheet in situ, the rubber composition may be forced into cavities formed in a plate, and one of the plies 10 or 12 pressed into contact with the deposited rubber to unite the bands to the ply.

Two of the plies 10 and 12 having bands 17 and 18 of rubber formed thereon may then be united face to face with the bands crossed to provide ventilating apertures.

The plies 10 and 12 are preferably formed of a porous fabric extensible in at least one direction and for this purpose knitted fabrics are very desirable. The coatings 11 and 13 are formed as a light deposit of rubber applied in such a manner as to coat one side of the plies with an adhesive without filling the interstices of the fabric. A light sprayed deposit of a thin dispersion of rubber provides a satisfactory adhesive coat.

The several plies of the compound fabric may be assembled in any desired manner such as by pressing them into contact by rolling pressure, the plies being either passed between rolls or assembled about a form. In the latter case the compound fabric will naturally retain to a certain degree any curvature present in the form, especially when the rubber portions thereof are vulcanized while on the form. Figs. 4 and 5 illustrate uses of the compound fabric where the several plies of material 12, 14 and 10 may be applied in succession about a form having a doubly curved surface or the assembled plies may be formed thereabout prior to vulcanization of the rubber portions. The completed articles may be vulcanized while on the form.

Where the expression "doubly curved" is used in this description it is intended to define a surface having such curvature that it cannot be developed or flattened out in a plane.

The use of the elastic layer 14 provides substantially equal strength and elasticity in all directions, limited in extensibility only by the extensibility of the fabric plies. The apertures in the elastic layer and the porosity of the fabric plies permit free ventilation of the body when garments made from the compound fabric are used in contact therewith, thereby avoiding objectionable heating of the body and providing for escape of perspiration.

The fabric facings provide against objectionable contact of rubber with the body and due to the porous nature of their uncoated exposed faces provide for ventilation of portions of the body underlying unperforated bands of the overlying elastic layer.

The fabric plies may also be of a decorative nature and are adapted to be provided in any desired color to enhance the appearance of the article.

We claim:

1. A ventilated fabric comprising a reticulated elastic sheet of rubber comprising crossed bands of rubber, and adhesively united thereto a plurality of distendable facing plies of porous textile material.

2. A ventilated fabric comprising a plurality of facings of porous textile material each provided with spaced bands of elastic rubber material united to one face thereof, the elastic bands of one facing being arranged to cross the bands of the other and adhesively united thereto to provide an elastic ventilated layer.

3. The method of making a ventilated fabric which comprises applying about a doubly curved form a porous distendable ply of textile material, applying thereover a foraminous layer of elastic rubber, appliying a second ply of porous distendable textile material, and vulcanizing the article while on the form.

4. The method of making a ventilated fabric which comprises adhesively applying spaced bands of elastic rubber to one face of a porous distendable ply of fabric, similarly applying spaced bands of elastic rubber to one face of a second ply of porous distendable fabric, and uniting the banded faces of the two plies with their bands crossed to provide ventilating apertures.

5. A ventilated fabric comprising a plurality of plies of extensible porous fabric, and a foraminous layer of elastic rubber therebetween and adhesively united thereto, said fabric layers being normally held in doubly curved relation by the elastic rubber layer.

6. A ventilated fabric comprising a plurality of plies of extensible porous fabric, and a reticulated layer of crossed bands of elastic rubber therebetween and adhesively united thereto, said fabric layers being normally held in doubly curved relation by the reticulated layer of rubber.

7. The method of making ventilated sheet material which comprises applying about a doubly curved form a layer of porous extensible textile material having spaced bands of elastic material upon one face thereof, applying thereover a second layer of porous extensible textile material having spaced bands of elastic material upon one face thereof, said layers being assembled with their bands of elastic material in crossed relation and in adhesive engagement with each other, and vulcanizing the assembled sheet while on the form.

8. The method of making a ventilated article which comprises forming a composite sheet comprising an openwork layer of elastic rubber and sheets of porous textile material embracing the same, conforming the composite sheet to a doubly curved form, and vulcanizing the sheet while it is held in formed condition.

ALFRED A. GLIDDEN.
VIRGIL H. BODLE.